UNITED STATES PATENT OFFICE.

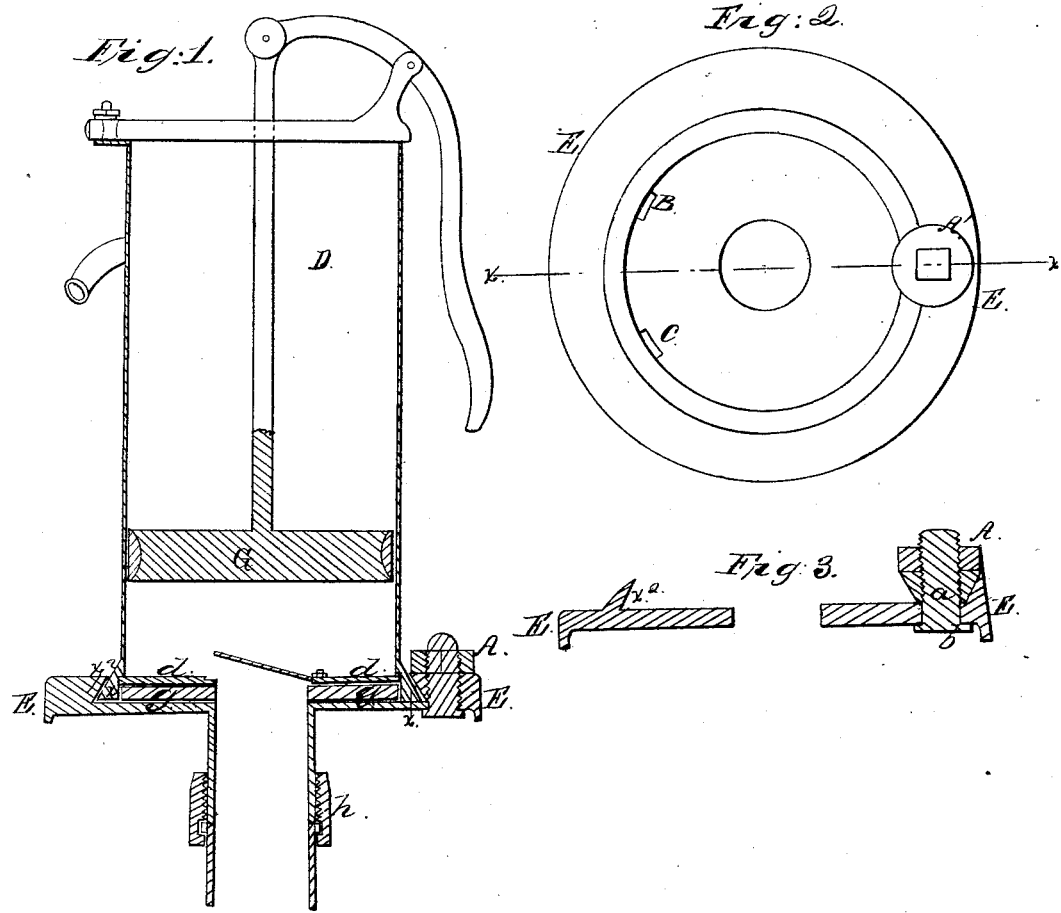

BENJN. DOUGLAS AND WILLIAM DOUGLAS, OF MIDDLETOWN, CONNECTICUT; SAID BENJN. DOUGLAS ADMINISTRATOR OF SAID WM. DOUGLAS, DECEASED.

PUMP.

Specification of Letters Patent No. 23,649, dated April 12, 1859.

*To all whom it may concern:*

Be it known that we, BENJAMIN DOUGLAS, of the town of Middletown, county of Middlesex, and State of Connecticut, and WILLIAM DOUGLAS, my late brother and partner in business, have invented a new and Improved Mode of Constructing Pumps; and I hereby declare that the following is a full and exact description thereof, reference being had to the accompanying drawings and letters of reference marked thereon.

The nature of the invention consists in the mode of attaching the pump barrel to the base and platform on which it is designed to rest; and to the top of the water pipe, so that the same may be attached to, and detached from, the platform and pipe, by merely turning a single screw bolt, or nut.

To enable others skilled in the art to make and use our invention I will proceed to describe its construction and application to use.

The body of the pump and its working parts are constructed on the usual heretofore plan used in our patent of 1842.

The present invention is confined to the devices used for fastening the pump in its place and to the valve apparatus.

In the accompanying sheet of drawings Figure 1, represents a sectional elevation of the pump and its fastening apparatus. Fig. 2, is a vertical view of the coupling ring which receives the base of the cylinder. Fig. 3, is a sectional elevation of the coupling ring E, E, and the conical set nut A, in place.

Similar letters and figures refer to the same parts in all the several drawings.

It is proper to remark that the devices herein claimed are equally applicable to the forcing, as to the lifting, pump.

The great object of the invention is to improve the mode of fastening the pump cylinder to the base on which it rests, so that the two may be easily detached at any time for the purpose of examining the valves and all the wearing parts, and more especially to facilitate repairing.

The lower end of the cylinder is expanded on the outer surface so as to be received into the base, or coupling ring, E, E, forming a dove tailed joint $x'$ $x'$. On the outer edge of said recess, is the flange projection $x^2$, on the inner face of which are two projecting lugs B, C, having the same inclination as the flange $x^2$. These lugs B, C, and the conical nut A, received into the hole A', form three bearing points for holding firmly in place the flaring extremity of the cylinder and constitute a dovetailed joint very strong, yet easily taken apart. The lower end of the cylinder has also a recess within it for receiving the lower valve ($d$) seated therein, and immediately below which is received the flange ($g$) of the leaden or other pipe for conducting the water from the reservoir into the pump cylinder.

D, represents the cylinder of the pump, and G, the upper valve, although its working parts are not shown.

The letter, $h$, represents the ordinary coupling.

The fastening of the cylinder in its place is made thus: Nut A, being unscrewed and removed, the lower end of the cylinder is slipped into its place under the edges of $x^2$ and against lugs B, C. Then the opposite side is allowed to drop into the recess and the nut A, to be screwed down upon it. The reverse operation, unscrews the nut and detaches the pump.

The great value of the construction rests on its extreme simplicity first and on the great firmness and durability of the parts; secondly and thirdly on the fact, that the fastening is made by the movement of a single piece of metal namely the conical binding screw or nut called the set bolt.

The great difficulty in detaching the ordinary cast iron pumps from the fixtures to repair them, when put together by screws, arises from the rusting of the metal and the consequent difficulty of starting rusty screws. All such difficulty is obviated by the present mode of fastening. By the present arrangement the pump can be set in the most cramped places, and at the same time the lower valve be reached with the greatest ease and facility, as the barrel or cylinder need not be turned around to accomplish the work. This cannot be done when the work is put together in the old way of screwing the valve seat into or on the end of the cylinder, as in such case the pump would have to be turned around to screw it down, and the spout in such case would strike the walls where it was attempted to set the pump in a corner, or close to a wall. Another point of advantage gained in this arrangement for the attaching and detaching of the pump from the platform or base is, that the three points of bearing used in the present device enable the face of the ring ($g$) formed by the upper end of the water pipe to press against the face of the leather valve and force the ring of it against the face of the shoulder in the recess of the cylinder and form a water tight joint therein, notwithstanding the leather may be thicker on one side than on the other. The joint could not be so made when the valve is confined in its place by a screw thread on the cylinder, as has been heretofore done. In order to make such joint water tight the unevenness of the leather must be removed by cutting away the thicker parts which weakens and thus injures the leather. Our devices cause the parts to adjust themselves to the face of the leather without removing any part of its substance. It will also be recollected that in our arrangement the spout can be set in any direction required without unfastening or taking up the flange from the platform on which it rests. Again a leather of different thickness may be placed in the joint for a packing on the lower valve and the same screwed up to its place without at all changing the direction of the spout from that which it had before. It is also obvious that a pump constructed in this manner, is so easily detached from its position in the yard of a dwelling house, or other exposed place, that in cold nights, or in exposure to injury from external violence, or in cases where a pump is only used occasionally, such as pumping water from cellars in very wet seasons, the pipe may be left in place, but the pump cylinder valves and all be removed, to a place of safety. It is also obvious that this form of coupling a pump to a water pipe is equally applicable to couple two pieces of pipe as water pipe, or gas pipe, &c.

Having fully described our invention of the method of fastening the lower part of the pump cylinder to the basis on which it rests, what is claimed herein as our invention and desired to be secured by Letters Patent is—

The combination of the lugs B and C, within the flange $x^2$, and the conical set nut A, substantially as described, for a fastening of the lower end of the pump cylinder.

BENJN. DOUGLAS.
BENJN. DOUGLAS,
*Administrator of Wm. Douglas, deceased.*

Witnesses:
EDW. F. BROWN,
V. D. GALE.